(12) United States Patent
Baekelandt et al.

(10) Patent No.: US 9,653,814 B2
(45) Date of Patent: May 16, 2017

(54) MODE GENERATOR DEVICE FOR A SATELLITE ANTENNA SYSTEM AND METHOD FOR PRODUCING THE SAME

(71) Applicant: NEWTEC CY, Sint-Niklaas (BE)

(72) Inventors: Bart Baekelandt, Wetteren (BE); Philip Sanders, Antwerp (BE); Guy Verstraeten, Borgerhout (BE)

(73) Assignee: NEWTEC CY, Sint-Niklaas (BE)

( * ) Notice: Subject to any disclaimer, the term of this patent is extended or adjusted under 35 U.S.C. 154(b) by 557 days.

(21) Appl. No.: 14/349,741

(22) PCT Filed: Oct. 2, 2012

(86) PCT No.: PCT/EP2012/069446
§ 371 (c)(1),
(2) Date: Apr. 4, 2014

(87) PCT Pub. No.: WO2013/050361
PCT Pub. Date: Apr. 11, 2013

(65) Prior Publication Data
US 2014/0253379 A1    Sep. 11, 2014

(30) Foreign Application Priority Data

Oct. 4, 2011    (GB) .................................. 1117024.8

(51) Int. Cl.
*H01Q 13/02*    (2006.01)
*H01P 1/16*    (2006.01)
(Continued)

(52) U.S. Cl.
CPC .......... *H01Q 13/0233* (2013.01); *H01P 1/16* (2013.01); *H01P 3/123* (2013.01); *H01Q 13/025* (2013.01);
(Continued)

(58) Field of Classification Search
CPC .. H01P 1/16; H01P 1/161; H01P 3/023; H01P 3/123; H01Q 13/0208;
(Continued)

(56) References Cited

U.S. PATENT DOCUMENTS 6,664,866 B2    12/2003    Yoneda et al.
6,771,225 B2    8/2004    Tits
(Continued)

FOREIGN PATENT DOCUMENTS

EP    1158594 A1    11/2001
EP    1278266 A1    1/2003
(Continued)

OTHER PUBLICATIONS

Great Britain Search Report for corresponding Great Britain Application No. 1117024.8, mailed Jan. 31, 2012.
(Continued)

*Primary Examiner* — Benny Lee
*Assistant Examiner* — Jorge Salazar, Jr.
(74) *Attorney, Agent, or Firm* — Workman Nydegger

(57) ABSTRACT

The present invention is related to a device for generating waveguide modes for use in a feed horn of a satellite antenna system, said waveguide modes comprising at least one excitation mode of higher order than the fundamental mode, said device comprising a waveguide containing a first waveguide section with at least three longitudinal slots extending in the inner side of said waveguide, characterized in that said waveguide contains a second waveguide section with at least three longitudinal slots extending in said inner side of said waveguide.

14 Claims, 5 Drawing Sheets

(51) Int. Cl.
  *H01P 3/123* (2006.01)
  *H01P 3/02* (2006.01)
  *H01Q 19/13* (2006.01)
  *H04B 14/00* (2006.01)
(52) U.S. Cl.
  CPC ......... *H01P 3/023* (2013.01); *H01Q 13/0208* (2013.01); *H01Q 19/132* (2013.01); *H04B 14/008* (2013.01)
(58) Field of Classification Search
  CPC ............. H01Q 13/0233; H01Q 13/025; H01Q 19/132; H04B 14/008
  USPC ...... 343/786; 333/21 R, 21 A, 239, 248, 251
  See application file for complete search history.

(56) References Cited

U.S. PATENT DOCUMENTS

| | | |
|---|---|---|
| 2002/0125968 A1 | 9/2002 | Yoneda et al. |
| 2003/0025641 A1 | 2/2003 | Tits |
| 2009/0109111 A1 | 4/2009 | McGonigle et al. |

FOREIGN PATENT DOCUMENTS

| | | |
|---|---|---|
| GB | 1525514 A | 9/1978 |
| JP | 2007251595 A | 9/2007 |

OTHER PUBLICATIONS

International Search Report for corresponding International PCT Application No. PCT/EP2012/069446, mailed Dec. 21, 2012.

Kildal, "Artifically Soft and Hard Surfaces in Electromagnetics," IEEE Transactions on Antennas and Propagation, Oct. 1, 1990, pp. 1537-1544, vol. 38, No. 10.

Lier, "Review of Soft and Hard Horn Antennas, Including Metamaterial-Based Hybrid-Mode Horns," IEEE Transactions on Antennas and Propagation Magazine, Apr. 1, 2010, pp. 31-39, vol. 52, No. 2.

Scharten et al., "Longitudinally Slotted Conical Horn Antenna with Small Flare Angle," IEE Proc. Jun. 1, 1981, pp. 117-123, vol. 128, No. 3.

Sharma et al., "Removal of Beam Squinting Effects in a Circularly Polarized Offset Parabolic Reflector Antenna Using a Matched Feed," Progress in Electromagnetics Research Letters, 2009, pp. 105-114, vol. 7.

Sotoudeh et al., "Single- and Dual-Band Multimode Hard Horn Antennas with Partly Corrugated Walls," IEEE Transactions on Antennas and Propagation, Feb. 1, 2006, pp. 330-339, vol. 54, No. 2.

Watson et al., "Dual-Polarised Mode Generator for Cross-Polar Compensation in Offset Parabolic Reflector Antennas," European Microwave Conference Proceedings, Paris, 1979, pp. 183-187.

MODE GENERATOR DEVICE FOR A SATELLITE ANTENNA SYSTEM AND METHOD FOR PRODUCING THE SAME

FIELD OF THE INVENTION

The present invention generally relates to the field of devices for use in antenna systems for two-way satellite communication networks.

BACKGROUND OF THE INVENTION

A typical satellite antenna system comprises a reflector dish and a horn antenna to convey radio waves between a transmitter/receiver (transceiver) and the reflector dish. In satellite communications the phenomenon of squint is well known. When the feed horn illuminates the parabolic offset reflector dish with a circularly polarized wave as shown in FIG. 1, the main lobe of the reflected secondary farfield radiation pattern is shifted away from the boresight axis (i.e. the axis of symmetry of the paraboloid defining the reflector dish) of the reflector dish in the horizontal plane. The direction in which the main lobe deviates is determined by the polarization: for the offset configuration typically used, left handed circularly polarized (LHCP) waves shift to the left and right handed circularly polarized (RHCP) waves shift to the right. The squint angle is inversely proportional to frequency. For a typical Ka-Ka band antenna configuration, the squint angle is around 60 mdeg in the transmit (TX) band (30 GHz) and around 90 mdeg in the receive (RX) band (20 GHz). Note that the Ka band satellite terminals typically use transmit frequencies between 27.5 GHz and 31 GHz and receive frequencies between 18.3 and 22 GHz. This large ratio between the transmit and receive frequencies (as compared to the frequency span of e.g. the Ku-band frequency plan (10.7-14.5 GHz)) imposes a challenge in the implementation of an antenna feed system.

Squint mainly causes problems when the receive and transmit beams are squinted in opposite directions, as occurs in a cross-polarized configuration, where the receive and transmit signals have opposite polarization. Such a situation is illustrated in FIG. 2: the RHCP transmit beam is shifted by 60 mdeg, the LHCP receive beam is shifted by −90 mdeg. This graph shows that when the antenna is pointed towards the satellite based on the received signal power, a minor receiver pointing error of 0.5 dB may cause a worst case pointing loss of 2.5 dB on the transmit channel.

Some more background information on the origin of squint is now provided. A parabolic offset reflector dish is considered illuminated by a linearly polarized feed horn that does not generate cross-polarized components when illuminating a prime focus reflector. The aperture fields of the reflector are depicted in FIG. 3 for linear horizontal and vertical polarizations, respectively. The presence of cross-polar field components is apparent: an offset reflector dish fed by a linearly polarized feed causes cross-polarization, even though the same feed will not create cross-polarization when used for a prime focus reflector.

The result for a circularly polarized horn is different and can be explained by considering that for both linear polarizations components of the circular polarized wave, the E-fields to the left side of the boresight axis are tilted counterclockwise, the E-fields to the right side clockwise. This means that for RHCP, the fields to the right are lagging in phase, the fields to the left are leading (and the opposite for LHCP). This phase difference causes the main lobe to shift away from the boresight axis, thus causing squint. The squint angle is given by the following equation $$\sin\theta = \frac{\pm\sin\psi}{4\pi\frac{F}{\lambda}}$$

whereby θ is the squint angle, ψ the offset angle, F the focal length and λ the wavelength.

While the end result is different for linear and circular polarization, the underlying cause is exactly the same. Techniques used to cancel cross-polar radiation for linear polarization are thus also suitable for compensating the squint in the case of circular polarization, provided that the phase relationship between the vertical and horizontal components remains undisturbed by the applied compensation technique.

FIG. 3(b) depicts the aperture fields of an offset reflector dish illuminated by a vertically polarized feed. The presence of horizontal field components is clear. Furthermore, they are symmetric with respect to the vertical axis. It is well known in the art that these components could be compensated by adding a waveguide mode with a field pattern where the horizontal field components are also symmetric with respect to the vertical axis. The vertically polarized $TE_{21}$ mode has this property, as illustrated in FIG. 4(a). It is thus possible to cancel the cross-polar components by adding this $TE_{21}$ mode with the right amplitude and phase to the fundamental mode (i.e. the $TE_{11}$ mode).

The case of horizontal polarization is similar. The aperture fields of the offset reflector are shown in FIG. 3(a). The presence of vertical field components, anti-symmetric with respect to the vertical axis, is also here apparent. They can be cancelled by adding a waveguide mode with a field pattern where the vertical components are anti-symmetric with respect to the vertical axis. The horizontally polarized $TE_{21}$ mode has this property, as is shown in FIG. 4(b). For the horizontal polarization, it is thus again possible to cancel the cross-polar components by adding this $TE_{21}$ mode with the right amplitude and phase to the fundamental mode (i.e. the $TE_{11}$ mode).

The above analysis was made for the compensation of cross-polar components in the case of linear polarization. One extra condition for squint compensation in case of circular polarization concerns the fact that the phase relationship between the vertically and horizontally polarized components must be maintained at 90°.

An antenna feed system which cancels cross-polar components for linear polarization and which maintains the correct phase relationship between both linear polarisations compensates squint so that in the frequency band where compensation is applied the beams for RHCP and LHCP are both aligned with the boresight axis. However, in case of opposite polarized transmit and receive beams, and if squint compensation is only implemented at the transmit frequency band, then the beam of transmit (e.g. RHCP) will not align with the receive beam (e.g. LHCP), because the latter is unaffected by squint compensation, and hence will not align along the boresight axis. Therefore, in this case, a solution would be desirable to overcompensate the squint and have the transmit beam aligned with the receive beam rather than with the boresight axis.

In the prior art several solutions have been proposed for squint compensation (for circular polarization) and for cross-polar cancellation (for linear polarization). The paper "Dual-polarised mode generator for cross polar compensation in offset parabolic reflector antennas" (Watson et al., European Microwave Conference Proceedings, Paris, 1979, pp. 183-187) proposes a horn based on the Potter-horn principle, which is extended with a mode generator for compensating cross-polar components for horizontal and vertical linear polarization. The mode generator is based on adding three rectangular waveguide stubs at 0° and ±45° which generate the $TE_{21}$ modes. Antecedent waveguide sections, i.e. located further away from the feed horn antenna, have a smaller diameter so that in this region, any generated $TE_{21}$ mode is in cut-off and therefore cannot propagate. Hence, any $TE_{21}$ mode generated further on but propagating backward will thus reflect at the smaller diameter step and combine with the forward propagating $TE_{21}$ modes. This is a way of isolating the $TE_{21}$ modes from any antecedent waveguide structure, such as a polarizer or an OMT (orthomode transducer). This is illustrated in FIG. 5. However, in a Ka-band architecture with RX frequency band 18.3-22 GHz and TX frequency band 27.5-31 GHz, for the $TE_{21}$ mode to be in cut-off for both bands, the diameter would need to be smaller than 9.4 mm, but this in turn would imply that the cut-off frequencies of the $TE_{11}$ modes are around 18.7 GHz, which is in conflict with the receive frequency range. Therefore, having a smaller diameter waveguide section which keeps the $TE_{21}$ modes in cut-off in the transmit-band is not a viable option for the Ka band frequency plan. Furthermore, the three stubs in this arrangement may upset the phase relationship between the horizontally and vertically polarized $TE_{11}$ modes, causing high cross-polarization in the radiated patterns when using this horn concept for circular polarization.

A variant of the feed horn proposed by Watson is disclosed in patent document EP 1278266 B1, where grooves are integrated in the step so that the component can be manufactured by die casting. The variant solution has been applied in a Ku-band (receive 10.7-12.7 GHz, transmit 14-14.5 GHz) product. The main characteristics of the proposed feed horn are similar to Watson. The step in diameter yields a waveguide section where the $TE_{21}$ modes cannot propagate. As described above, this technique cannot be scaled to a Ka band frequency plan. This horn compensates the cross-polar components when using linear polarization, but, again, is not optimized for circular polarization.

Also in GB 1525514 a section of narrow waveguide blocks backward propagating $TE_{21}$ modes.

Sharma et al. describe in "Removal of Beam Squinting Effects in a Circularly Polarized Offset Parabolic Reflector Antenna Using a Matched Feed" (Progress in Electromagnetics Research Letters, vol. 7, pp. 105-114, 2009) a tri-mode matched feed horn to remove the beam squinting effects in a circularly polarized offset parabolic reflector antenna. The solution is based on three pins, which are spaced apart over 120°.

SUMMARY OF THE INVENTION

It is an object of embodiments of the present invention to provide a mode generator device wherein the use of a step for reflecting higher order modes (i.e. higher than the fundamental mode) is avoided. A further objective is to provide a mode generator device suitable for a dual-band satellite system that in case circular polarization is applied, allows aligning a right handed circularly polarized transmit beam not with the boresight axis, but with a left handed circularly polarized receive beam (which is directed to the opposed side of the boresight axis) or vice versa. It is a further object of the invention to present a method to produce such a mode generator device.

The above objective is accomplished by a device according to the present invention and the method for producing said device. Such a device is capable of re-aligning a transmit beam.

Particular and preferred aspects of the invention are set out in the accompanying independent and dependent claims. Features from the dependent claims may be combined with features of the independent claims and with features of other dependent claims as appropriate and not merely as explicitly set out in the claims.

The present invention relates to a device for generating waveguide modes for use with a feed horn of a satellite antenna system, whereby said waveguide modes include at least one excitation mode of higher order than the fundamental mode. The device comprises a waveguide with a first waveguide section with at least three longitudinal slots extending in the inner side of the waveguide and contains a second waveguide section with at least three longitudinal slots also extending in the inner side of the waveguide. The waveguide has preferably, but not necessarily, a circular cross-section. The waveguide modes are generated in the upper frequency band, which is typically the transmit frequency band. It may however be the receive frequency band. Throughout the rest of this description the use of the terms 'transmit band' and 'receive band' is interchangeable. For ease of reading a scenario is considered where transmission occurs in the highest frequency band.

By providing a second waveguide section with longitudinal slots (also referred to as grooves in the explanation below) the use of a step (i.e. a change in dimensions of the waveguide cross-section) is indeed avoided and hence also the associated frequency range restriction. Furthermore, higher levels of forward higher order modes can be generated due to the presence of such a second section, which is desirable for achieving the large beam re-alignment, as required for squint overcompensation. Such a high amount of higher modes allows aligning the main beam of the transmit channel closer to the main beam of the receive channel. Prior art solutions aligned the main beam of the transmit channel with the boresight direction and are sub-optimum for multi-band applications. The proposed solution is particularly suited for use in the Ka frequency plan where the minimum to maximum frequency can have a ratio as high as 1 to 1.7.

Advantageously, a small ungrooved section is provided between the two waveguide sections. The length of this section is one of the parameters to optimize the design of the device. Such an ungrooved section is particularly useful for production optimisation as it allows separating the longitudinal grooves in the waveguide sections in case the grooves of both sections are in line.

In a preferred embodiment the longitudinal slots of the second waveguide section are rotated along the waveguide axis with respect to the slots of the first waveguide section. This allows obtaining a more compact structure, as the gap between the sections can then be reduced. Preferably the rotation angle between the waveguide sections is substantially 180°.

The number of longitudinal slots in the first and second waveguide section is preferably (but not necessarily) the same. In one preferred embodiment the two waveguide sections each contain three grooves. Such a set-up is convenient in case linear polarization is applied. Two grooves are then typically mounted at an angle in the range of 35° to 55° and an angle in the range of −35° to −55° with respect to the centre groove in between, preferably at angles of substantially +45° and −45°, respectively. Also the rotation angles are parameters that can be optimized for a specific implementation.

In another preferred embodiment at least one of the waveguide sections has five longitudinal slots, which makes the device particularly suitable for squint compensation in the case of circular polarization.

In such an embodiment with at least one section having five grooves, these grooves are preferably so positioned that they are at angles of substantially +45°, −45°, +90° and −90°, respectively, with respect to the groove in the centre. Providing grooves at substantially +90° and −90° is particularly advantageous for compensating differential phase shift between the horizontal and vertical polarized $TE_{11}$ fundamental modes, caused by the other grooves, and hence suitable for circular polarization.

In another advantageous embodiment the longitudinal slots of the first and second waveguide section have one end reaching an extremity of the waveguide. This is in particular advantageous for die-cast production techniques.

In another embodiment of the invention the above principles are extended to a cascade of more than two waveguide sections, each with at least three slots.

In a preferred embodiment the at least three longitudinal slots of the individual waveguide sections have a length shorter than the distance between the extremities of said device. Hence, they do not extend from one extremity of the device to the extremity at the opposite side. In other words, there are two distinguishable waveguide sections in the device.

In a second aspect the invention relates to a feed antenna system comprising a device for generating waveguide modes as previously described.

The invention further relates to a satellite antenna system comprising such a feed antenna system and an offset reflector dish.

In another aspect the invention relates to a method for producing a device for generating waveguide modes as previously described. The method is characterised by a step of die-casting, whereby, when die casting, cores defining the at least three longitudinal slots of the first and second waveguide sections come in at the edges of the mode generating device and are subsequently removed from said edges.

In yet a further aspect the invention relates to the use of a device for generating waveguide modes as previously described for overcompensating squint in a satellite communication system wherein circular polarization is applied or for compensating cross-polar components in a satellite communication system wherein linear polarisation is applied.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
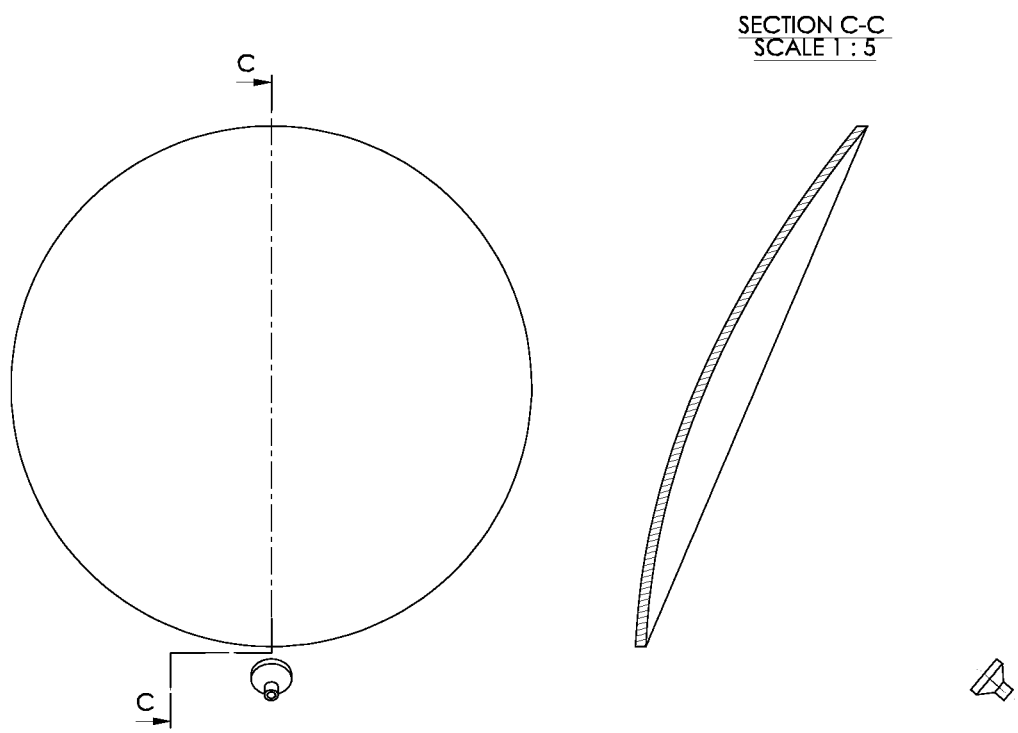
FIG. 1 represents a front view and side view of a feed horn device illuminating a parabolic offset reflector dish.
Figure 2:
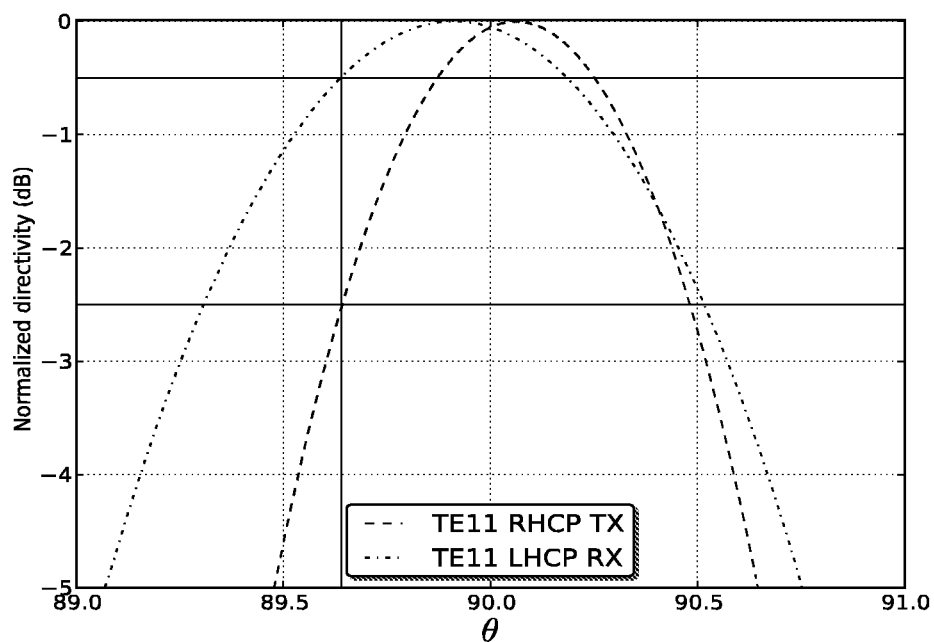
FIG. 2 illustrates the effect of squint.
Figure 3:
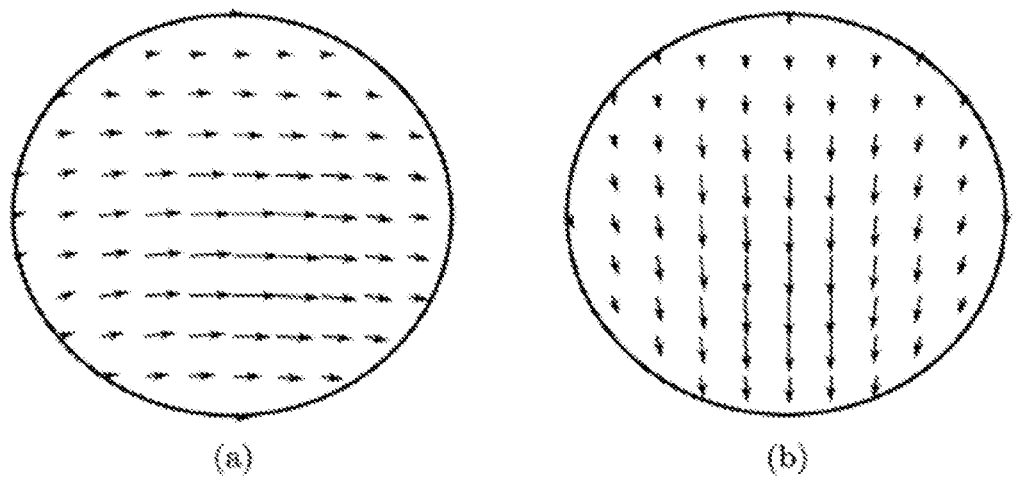
FIGS. 3a and 3b represent the aperture fields of a parabolic reflector illuminated with a feed without cross-polarization.
Figure 4:
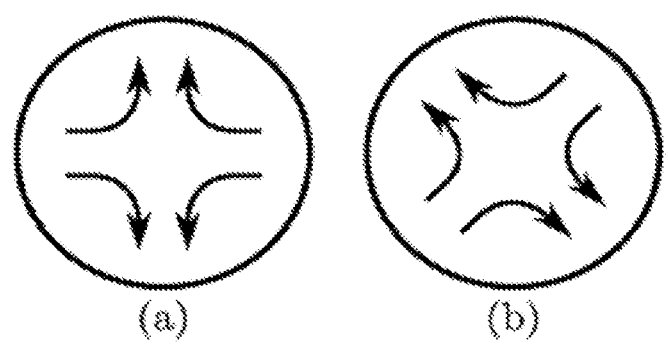
FIGS. 4a and 4b represent the relevant modes for squint compensation.
Figure 5:
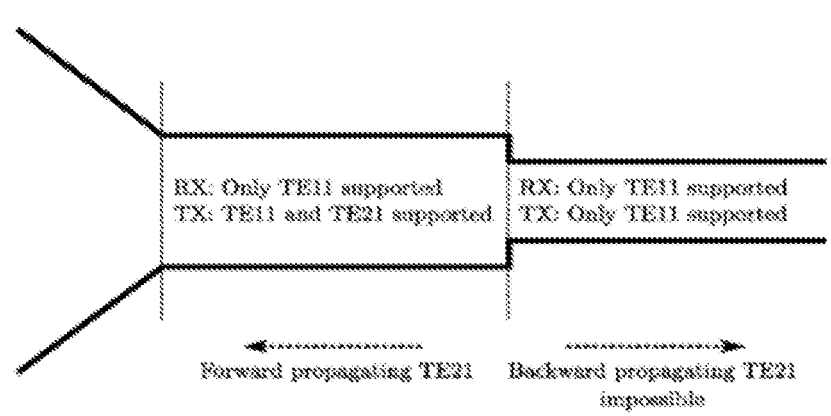
FIG. 5 represents a low diameter waveguide section as known in the prior art.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being redefined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

As explained in the background section, $TE_{21}$ modes, i.e. higher order modes, must be generated for compensating squint or for cancelling cross-polar radiation. The required relative level and phase of the $TE_{21}$ mode can be found from evaluating the secondary $TE_{21}$ and $TE_{11}$ radiation patterns, i.e. from the secondary radiation patterns resulting from the $TE_{21}$ and $TE_{11}$ excitation.

From such an analysis, one finds that in the case of linear polarization, with a relative $TE_{21}$ level of approximately −15 dB combined with the correct relative $TE_{21}$ phase, cross-polar components caused by offset illumination are cancelled. In the case of circular polarization, this same level and phase of the $TE_{21}$ modes results in the compensation of squint, i.e. the alignment of the main lobe of the transmit secondary radiation pattern with the boresight axis of the parabolic antenna. By generating progressively higher levels of the $TE_{21}$ mode, one can reorient the main lobe even further than the boresight axis. This can be considered "squint overcompensation" and is particularly useful when the receive channel has opposite circular polarization with respect to the transmit channel. In this case, the receive main lobe is on the opposite side of the boresight axis with respect to the uncompensated transmit main lobe. Generating higher amounts of $TE_{21}$ modes progressively brings the transmit main lobe closer to the receive main lobe, decreasing the transmit pointing error. Hence, it is very advantageous that the proposed device is capable of generating the required high $TE_{21}$ levels.

The mode generator device according to the present invention comprises a first and a second waveguide section each provided with at least three grooves on the inner side of a substantially circular waveguide. The grooves of the individual waveguide sections do not extend from one extremity of the device to the opposite extremity. Due to the cascade of two sections with their respective sets of grooves there is no need any more to have a part of the waveguide of smaller diameter in order to block $TE_{21}$ modes that propagate in the unwanted backward direction. By optimisation of the configuration, it is possible to substantially suppress the backward propagating $TE_{21}$ modes. Further, because of the presence of two sections, higher levels of a higher order mode can be generated. Moreover, the high levels as specified above, as well as their optimum phase relationships, together with substantial suppression of backward propagating $TE_{21}$ modes can be achieved by optimizing parameters as the number of grooves, position of the grooves and the dimensions of the grooves.

The optimal number of grooves also depends on the kind of polarization applied. Below, an embodiment is illustrated for circular polarization achieving squint overcompensation for a configuration with opposite transmit and receive polarizations.

Figure 6:
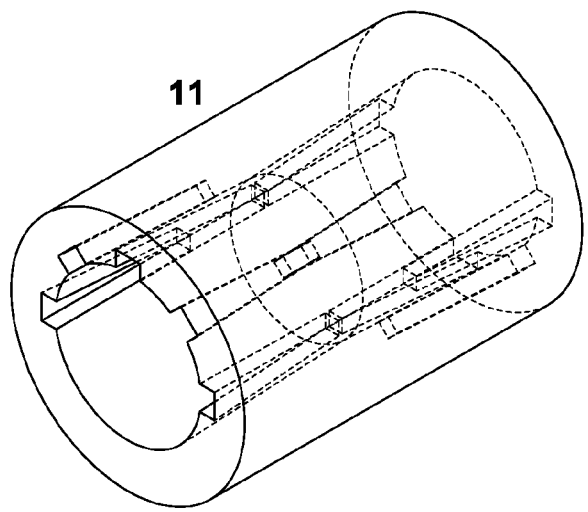
FIG. 6 represents an embodiment of the mode generator according to the invention.
Figure 6:
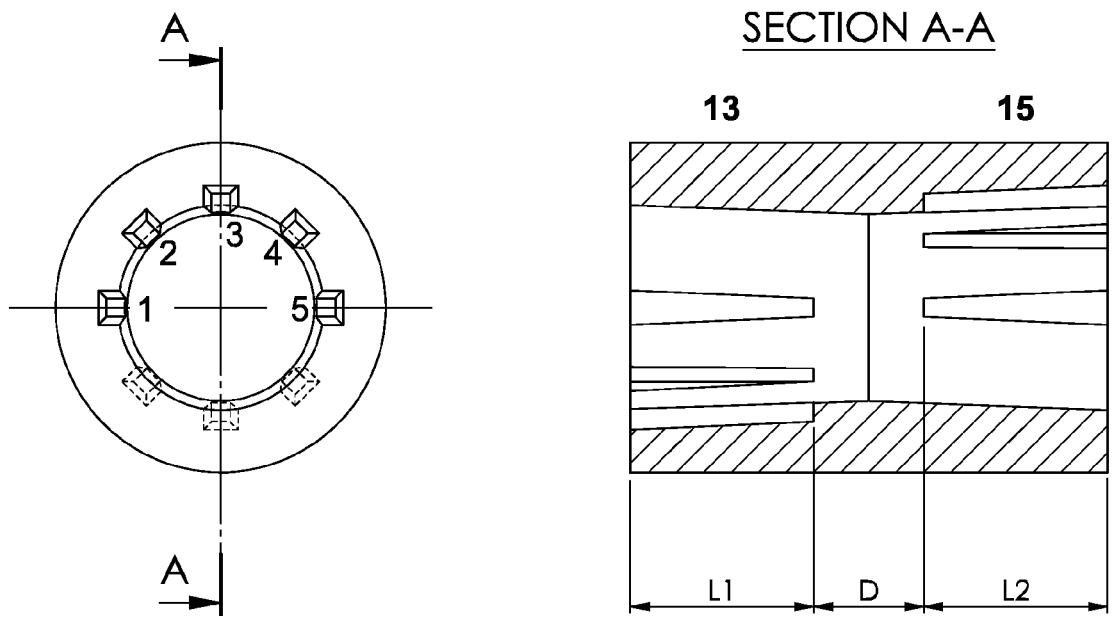
Figure 7:
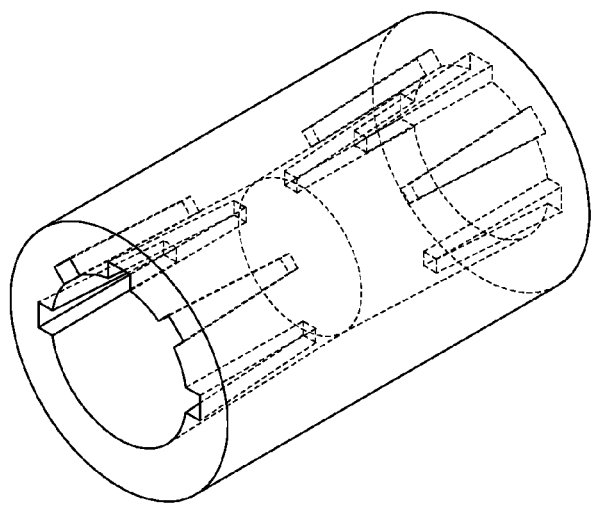
FIG. 7 represents another embodiment of the mode generator according to the invention.
Figure 7:
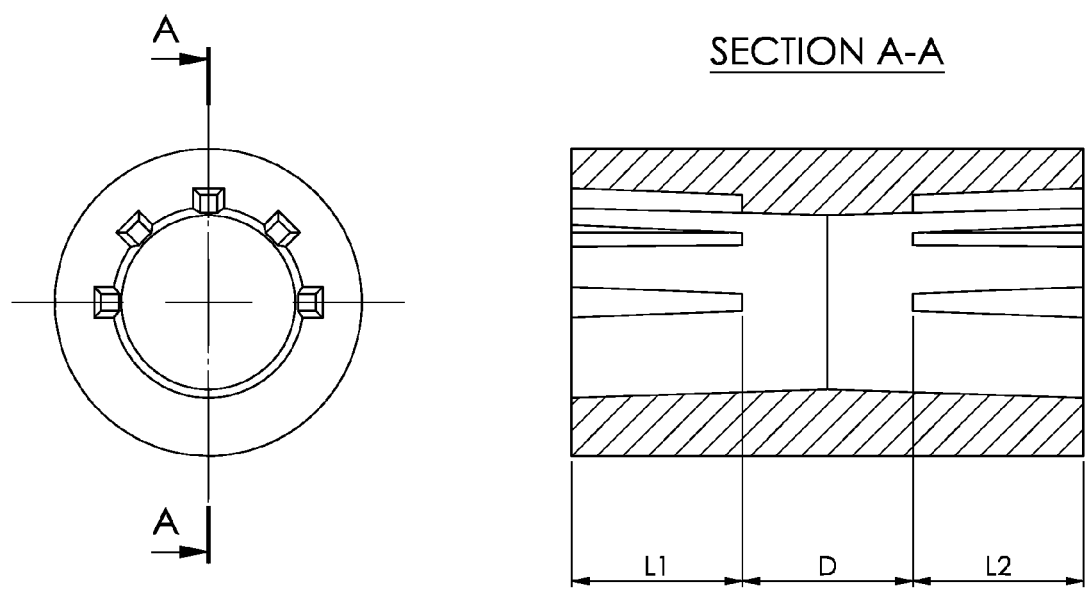
Figure 8:
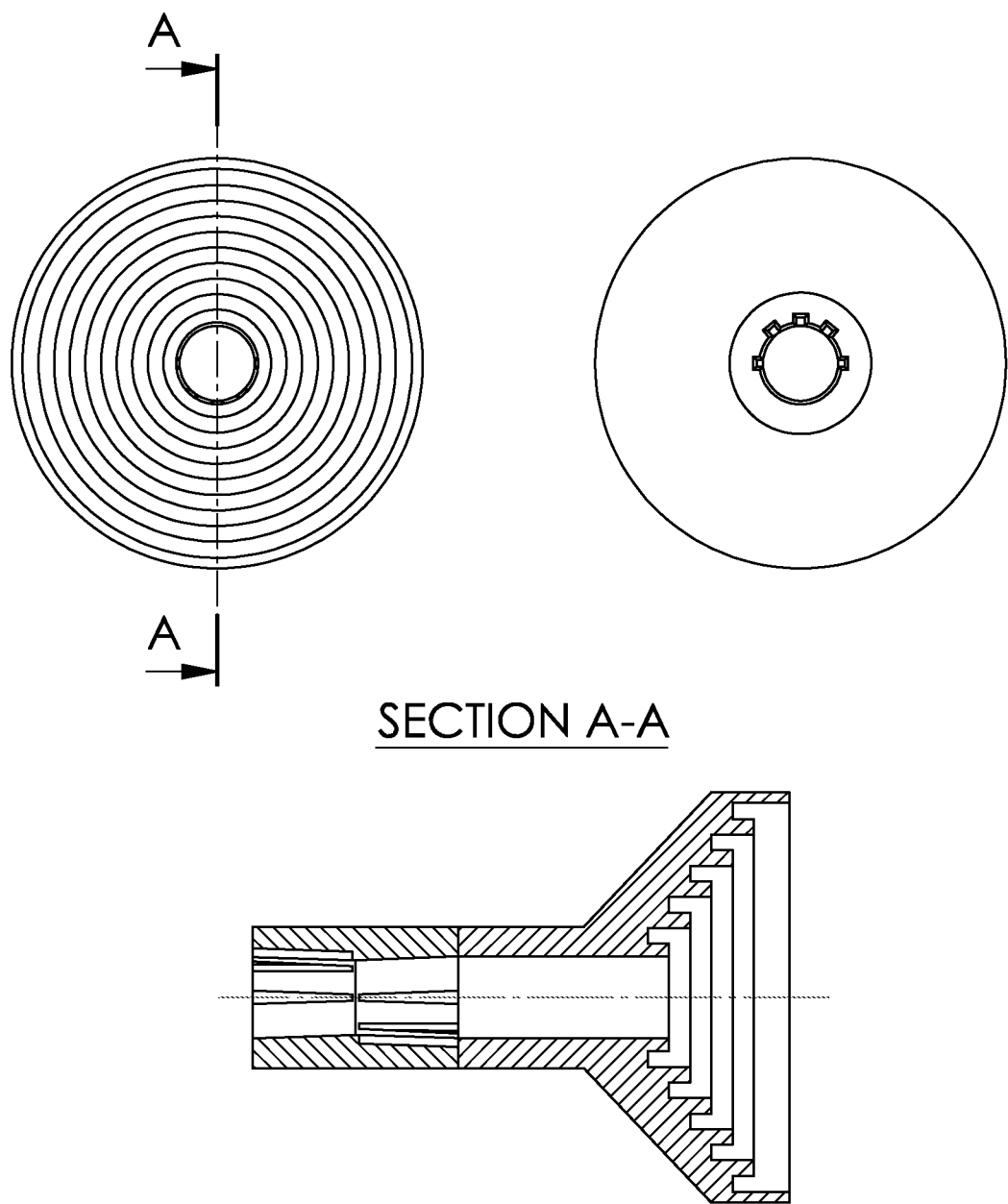
FIG. 8 illustrates the integration of a mode generator according to the present invention with a feed horn antenna.

FIG. 6 illustrates an embodiment of the mode generator for squint overcompensation according to the present invention. Its integration with a horn antenna is shown in FIG. 8. The mode generator shown in FIG. 6 contains a total of 10 (i.e. two times 5) grooves. The basis is a section with five grooves. A similar section is added behind but rotated by 180° around the axis, with a short spacing section in between without grooves. It is possible to obtain similar performance without the 180° rotation. Such a mode generator device is shown in FIG. 7. However, the sections with grooves would have to be spaced further from each other which results in a longer structure. An arrangement with two sections, either mutually axially rotated or not, is advantageous in that it allows higher levels of $TE_{21}$ modes to be generated. Within each five-groove section, the groove at 0° (groove 3 in FIG. 6) converts part of the horizontally polarized $TE_{11}$ wave into the horizontally polarized $TE_{21}$ wave. The grooves at approximately 45° and −45° (grooves 2 and 4 in FIG. 6) convert part of the vertically polarized $TE_{11}$ wave into the vertically polarized $TE_{21}$ wave. The grooves at 90° and −90° (grooves 1 and 5 in FIG. 6) have no influence on the mode generation but compensate the differential phase shift between the vertically and horizontally polarized $TE_{11}$ modes, as required for circular polarization. If only cross-polar optimization for linear polarization is required then the latter grooves at 90° and −90° can be omitted.

With the two section mode generator device of the invention $TE_{21}$ modes with a level of −10 dB are generated while obtaining good return loss in both transmit and receive bands and ensuring a low level of backward propagating $TE_{21}$ modes. Differential phase shift between vertical and horizontal $TE_{11}$ modes is kept sufficiently low in both bands. As compared to a typical cross-polarized Ka-band antenna configuration, a same $TE_{21}$ level (of e.g. −10 dB) for transmit now yields a considerably smaller transmit beam misalignment with reference to the receive beam. The worst case transmit pointing error is thereby also reduced.

The proposed two section mode generator can be mass-manufactured as a single mechanical part by die-casting with cores (sometimes also called sliders) coming in from two sides. During the die casting the cores, which define the grooves, can be removed from the extremities of the mode generating device. As typical for die-cast parts, a small draft angle (approx. 1.5°) needs to be taken into account during design so that the cores can be removed.

In case there is an odd number of sections one grooved waveguide section can be integrated either in the horn antenna or in an antecedent waveguide component.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A device for generating waveguide modes for use with a feed horn of a satellite antenna system, said device comprising:
   a waveguide containing a first waveguide section with at least three longitudinal slots extending in the inner side of said waveguide, wherein said waveguide contains a second waveguide section with at least three longitudinal slots extending in said inner side of said waveguide,
   wherein said waveguide is configured to generate waveguide modes including at least one excitation mode of higher order than a fundamental mode.

2. The device for generating waveguide modes as in claim 1, wherein said first waveguide section and said second waveguide section are separated by a section without slots.

3. The device for generating waveguide modes as in claim 1, wherein said at least three longitudinal slots of said second waveguide section are oriented at positions rotated around an axis of said waveguide with respect to said at least three longitudinal slots of said first waveguide section.

4. The device for generating waveguide modes as in claim 3, wherein said positions of said at least three longitudinal slots of said second waveguide sections are rotated around said axis over an angle of substantially 180° with respect to said at least three longitudinal slots of said first waveguide section.

5. The device for generating waveguide modes as in claim 1, wherein the at least three longitudinal slots of said first and second waveguide sections each have one end reaching an extremity of said waveguide.

6. The device for generating waveguide modes as in claim 1, wherein said at least three longitudinal slots of said first waveguide section have exactly three longitudinal slots and said at least three longitudinal slots of said second waveguide section have exactly three longitudinal slots.

7. The device for generating waveguide modes as in claim 6, wherein two longitudinal slots of said at least three longitudinal slots of each of said first and second waveguide sections are correspondingly mounted at angles in the range of +35° to +55° and −35° to −55° with respect to the third longitudinal slot around an axis of said waveguide, said third longitudinal slot forming a centre slot.

8. The device for generating waveguide modes as in claim 1, wherein said at least three longitudinal slots of at least one of said first waveguide section and said second waveguide section each have exactly five longitudinal slots.

9. The device for generating waveguide modes as in claim 8, wherein four longitudinal slots of said five longitudinal slots of the at least one of said first waveguide section or said second waveguide section are correspondingly mounted at angles in the range of +35° to +55° and −35° to −55° and angles of substantially +90° and −90° with respect to a fifth longitudinal slot of said five longitudinal slots around an axis of said waveguide, said fifth longitudinal slot forming a central slot.

10. The device for generating waveguide modes as in claim 1, wherein said at least three longitudinal slots of said first waveguide section and second waveguide section each have a length shorter than the distance between extremities of said device.

11. A feed antenna system comprising the device for generating waveguide modes as in claim 1.

12. A satellite antenna system comprising an offset reflector dish and the feed antenna system as in claim 1 being arranged for conveying radio waves to or from said offset reflector dish.

13. A method for generating waveguide modes using the device according to claim 1 for overcompensating squint in a satellite communication system wherein circular polarization is applied or for compensating cross-polar components in a satellite communication system wherein linear polarisation is applied.

14. A method for producing a device for generating waveguide modes for use with a feed horn of a satellite antenna system, the method comprising:
   die casting a waveguide, said waveguide containing a first waveguide section with at least three longitudinal slots extending in the inner side of said waveguide, wherein said waveguide contains a second waveguide section with at least three longitudinal slots extending in said inner side of said waveguide, wherein said waveguide is configured to generate waveguide modes including at least one excitation mode of higher order than a fundamental mode; and
   removing cores defining said at least three longitudinal slots of said first and second waveguide sections.

* * * * *